United States Patent [19]

Kato

[11] 4,288,183

[45] Sep. 8, 1981

[54] TOOL HOLDER OR SPINDLE

[76] Inventor: Taizo Kato, 3007-104 Obatahigashijima, Moriyamaku, Nagoya, Japan

[21] Appl. No.: 59,255

[22] Filed: Jul. 19, 1979

[30] Foreign Application Priority Data

Jul. 27, 1978 [JP] Japan .......................... 53-103852[U]

[51] Int. Cl.³ ....................... B23B 41/00; B23B 47/18
[52] U.S. Cl. .................................. 408/142; 408/134; 408/137
[58] Field of Search ............... 408/142, 139, 137, 134, 408/132

[56] References Cited

U.S. PATENT DOCUMENTS

| | | | |
|---|---|---|---|
| 1,681,288 | 8/1928 | Galloway | 408/142 |
| 2,869,153 | 1/1959 | Capek et al. | 408/137 |
| 3,145,401 | 8/1964 | Burg | 408/137 |
| 4,090,806 | 5/1978 | Kato | 408/139 |

*Primary Examiner*—Leonidas Vlachos
*Attorney, Agent, or Firm*—Merriam, Marshall & Bicknell

[57] ABSTRACT

This disclosure relates to a tool holder including a driving cylinder, a driven cylinder reciprocatable and rotatable within the driving cylinder and attachable with a tool, first threaded means reciprocatable and rotatable together with the driven cylinder and having the same pitch as that of said tool, and second threaded means in threading engagement with the first threaded means and rotatable relative to and engageable with part of the driving cylinder to stop axial movement away from a workpiece and adapted to prevent its rotation relative to said first threaded means, such that the rotation of said first threaded means forces the tool to be advanced accurately with the same pitch as that of the tool.

6 Claims, 5 Drawing Figures

TOOL HOLDER OR SPINDLE

The present invention relates to a tool holder for use with a machine tool, and especially to a tap holder or tapping spindle with which the tapped depth and pitch can be controlled.

Because of their complicated construction and operation, very few conventional types of tapping spindles have been put into use which are able to drive the tap or control the advance or lead of the tap so that a workpiece may be tapped and the pitch is precisely the same as that of the tap.

At the same time, some types of tapping spindles have been provided, having a depth control, which includes a driven member for holding a tap, the driven member being held axially resiliently within a driving member in order to absorb axial shocks to or axial overloads on the tap. Such a spindle is exemplified in my U.S. Pat. No. 4,090,806 dated May 23, 1978.

It is an object of this invention to provide a tool holder having a pitch control for precision tapping or boring to a predetermined pitch.

It is another object of this invention to provide a multi-function tool holder which is able to control tapping or boring depth and either to control tapping or boring pitch or to absorb axial shocks to or axial overloads on the tool when the pitch control is not used.

It is a further object thereof to provide a tool holder for use with a chuck that is easy to attach thereto and detach therefrom.

Preferred embodiments of the invention are described hereinafter by way of example with reference to the accompanying drawings, wherein.

DEPTH CONTROL

Figure 1:
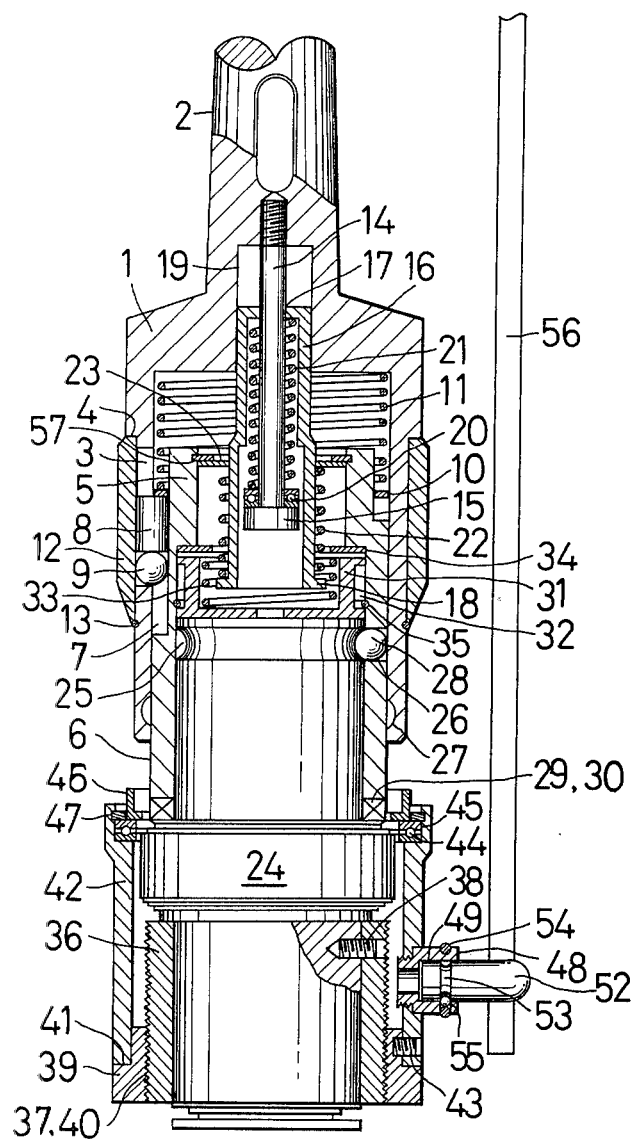
FIG. 1 is an elevational view mainly in section of a tool holder according to this invention, at its normal position.
Figure 2:
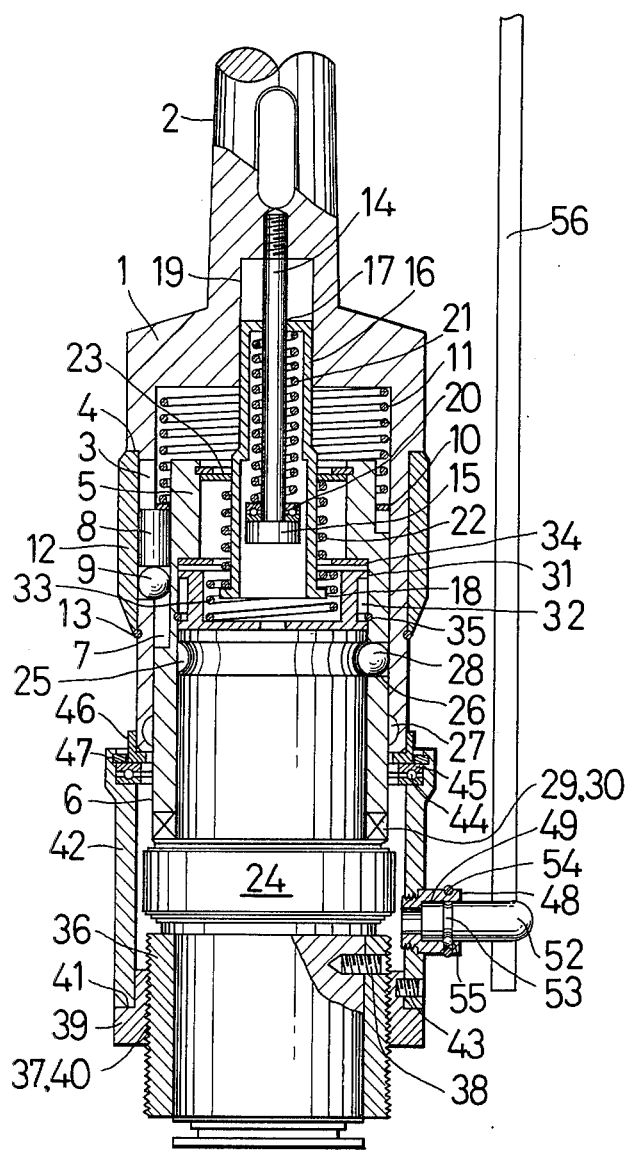
FIG. 2 is a view similar to FIG. 1 but showing the parts at a position during tapping a workpiece.
Figure 3:
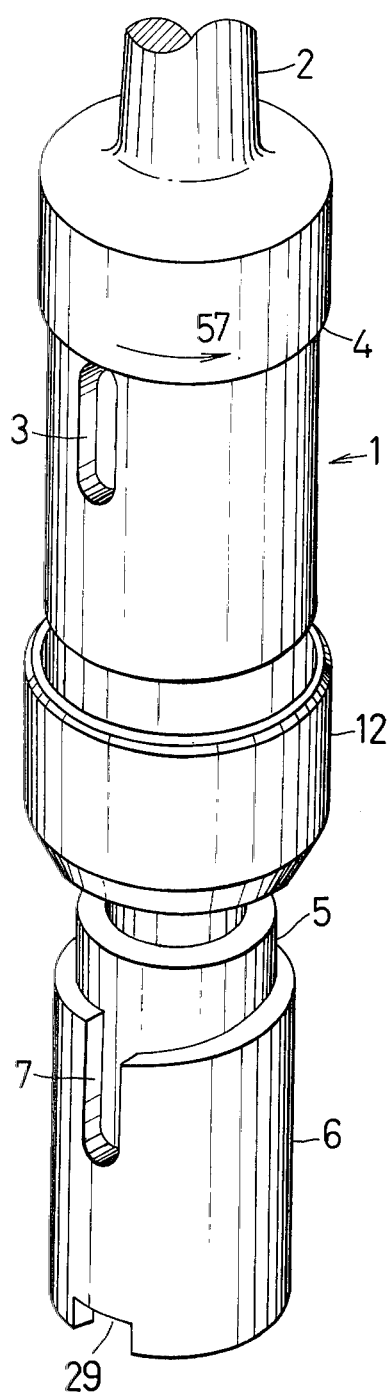
FIG. 3 is a perspective, exploded view of some of the parts shown in FIGS. 1 or 2.

The depth control shown in FIGS. 1-3 is, by itself, not a part of this invention. It is substantially equivalent or very similar to the control disclosed in said U.S. Pat. No. 4,090,806, and it will be only briefly explained.

With reference to FIGS. 1-3, a driving cylinder 1 has a shank 2 at one end; it is open at the other end and it has at least one axial slot 3 (FIG. 3) formed through the side wall thereof at an axially intermediate position. A driven cylinder or socket shaft 5, which is open at both ends, is reciprocatable and rotatable within the cylinder 1. A clutch sleeve 6, which may be fixed to or formed integrally with the driven cylinder 5, has an axial groove 7 (FIG. 3) aligned with the slot 3, the groove 7 being open at the end which is inwardly (or upwardly) of the driving cylinder 1. The inner or top edge of sleeve 6 slopes as shown in FIG. 3 so that the leading corner or edge of the open end of groove 7 makes an obtuse angle with an axial line and the trailing corner makes an acute angle. A set including a roller 8 and a ball 9 is axially slidable within the slot 3 and the groove 7, and the set normally engages both of them to transmit rotational torque from the cylinder 1 to the cylinder 5. A compression spring 11 is placed between an inner, radial wall of cylinder 1 and a ring 10 which is slidable around an upper portion of the cylinder 5. The ring 10 compressively engages the top edge of either the clutch sleeve 6 or the roller 8. A cover sleeve 12 is provided around the cylinder 1 and it is axially fixed at one end by a step 4 formed in the cylinder 1 and by a stop ring 13 secured to the cylinder 1, the sleeve 12 keeping the roller 8 and the ball 9 from falling out.

With reference to FIGS. 1 and 2, a rod or bolt 14 is threaded or otherwise secured at one end to the center of the inner end of cylinder 1, and extends outwardly and terminates in an enlarged bottom or head 15. A spring holder 16, which is reciprocatable within the cylinder 5, is formed with a central hole 17 through the inner end thereof and slides along the bolt 14, and the holder 16 has a radial flange 18 at the other end. An upper portion of holder 16 is slidable within an axial bore 19 formed in the cylinder 1. Placed between the inner end of holder 16 and a thrust bearing 20 located on the bottom 15 of rod 14, is a compression spring 21 which urges the holder 16 upwardly or inwardly of the cylinder 1. Another compression spring 22 is placed around the outside of the holder 16 between the flange 18 and a ring 23 which is slidable on the outside of the holder 16, the ring 23 engaging a stop 57 secured to the cylinder 5 adjacent its inner end thereby to urge the cylinder 5 axially inwardly due to the force of the springs 21 and 22, which should preferably be comparatively long and weak.

CHUCK MECHANISM

A chuck 24, for holding a tool (not shown) at the bottom thereof, has a portion of a diameter adapted to fit within a portion of the cylinder 5 that projects axially outward of the cylinder 1, and a peripheral groove 25, preferably semicircular in cross section is formed adjacent its inner end. The cylinder 5 is formed with at least one radial hole 26 through a side wall thereof corresponding in diameter and position to the peripheral groove 25. The cylinder 1 is formed with an annular groove 27 inside and adjacent the outer end thereof, which is preferably semi-circular in cross section. It is important that the annular groove 27 be formed at a position which is outwardly away from the hole 26 when the cylinder 5 is at the maximum outwardly telescoped position during tapping or boring, thus preventing the chuck 24 from leaving the cylinder 5 during a tapping operation.

When the chuck 24 is attached to the cylinder 5, a ball 28 engages both the groove 25 and the hole 26 to secure the chuck 24 axially relative to the cylinder 5. The chuck 24 and the cylinder 5 are rotatable secured together by at least one recess 29 (FIG. 3) in the outer end of cylinder 5, which is engaged by a radial projection 30 of the chuck 24.

A ball keeper 31, slidable within the cylinder 5, has an annular peripheral groove 32, an open inner end and a bottom wall. A compression spring 33 between the bottom wall of the keeper 31 and a stopper ring 34 which engages a step in the inner wall of the cylinder 5, causes the keeper 31 to resiliently engage the inner end surface of chuck 24.

To detach the chuck 24 from the cylinder 5, the chuck 24 is pulled downwardly or out of the cylinder 1, together with the cylinder 5, against the force of springs 21 and 22 until the hole 26 is aligned with the annular groove 27. Then, the ball 28 is able to leave the peripheral groove 25 and move into the groove 27, so that the chuck 24 may be moved axially relative to the cylinder 5. As the cylinder 5 is spring-urged inwardly, the chuck 24 is further pulled out to detach from the cylinder 5 while the keeper 31 closely follows the inner end surface of the chuck 24 to force the ball 28 at its bottom periphery into the groove 27 of the cylinder 1. When the bottom periphery of the keeper 31 is approximately radially aligned with the center of the ball 28, the inner end of the peripheral groove 32 engages a stop ring 35 secured to the inner wall of the cylinder 5, to stop the keeper 31 from moving further outwardly, whereby the ball 28 continues to engage both the hole 26 and groove 27. It will be understood that, when the chuck 24 is to be attached to the holder, the movement of the parts is reversed.

The spindle only with the parts and arrangements set forth so far may operate as a tapping or boring spindle with a depth control as will be explained later.

PITCH CONTROL

Figure 4:
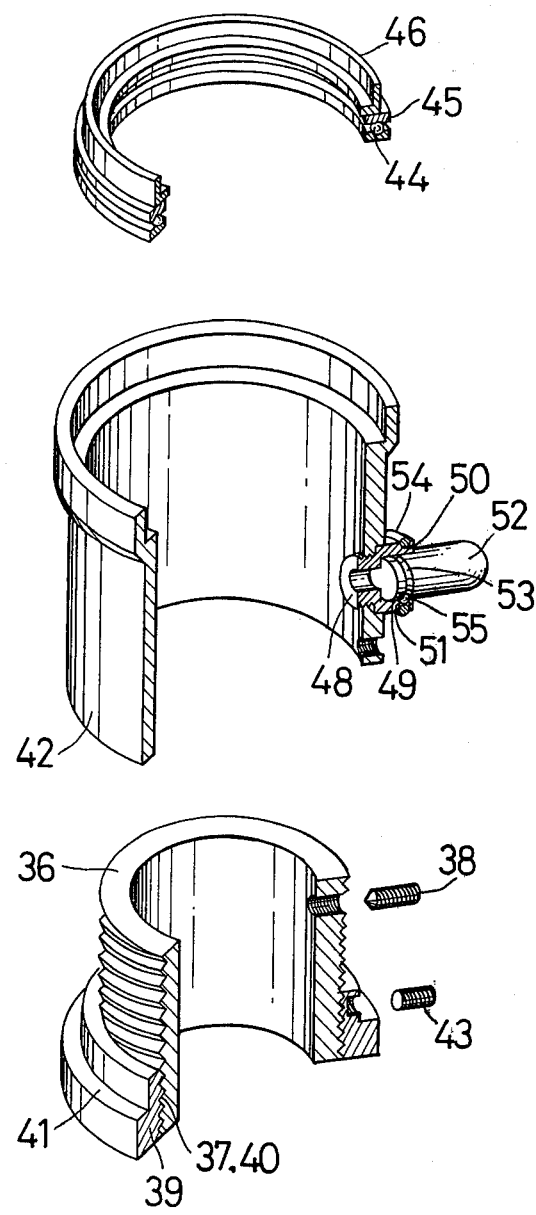
FIG. 4 is a perspective, exploded, axially sectional view of other parts shown in FIGS. 1 or 2.

FIG. 4 along with FIGS. 1 and 2 shows the pitch control system that is a most important feature of this invention.

A threaded sleeve 36 has an outer thread 37 having the same pitch as that of a tap (not shown) to be used, and an inner diameter that fits around a portion of the chuck 24 that projects from the cylinder 5. The sleeve 36 and chuck 24 can be detachably secured together by a screw 38. A threaded ring or sleeve 39 has an inner thread 40 for threading engagement with the thread 37 of the sleeve 36, and it has a radially enlarged bottom forming a step 41. A sleeve 42 having an inner diameter that is larger than the outer diameters of the chuck 24 and the sleeve 36, engages the step 41 at its lower end and is detachably fixed to the threaded ring 39 by a screw 43.

The sleeve 42 has an annular recess in its inner wall at the upper end, in which a thrust bearing 44 is placed. The bearing 44 has a rotatable upper race 45 to which an annular seat 46 is secured. The bearing 44 is axially fixed to the sleeve 42 by a stop ring 47 while the upper race 45 and annular seat 46 are rotatable relative to the sleeve 42.

The sleeve 42 has at least one threaded hole in the side wall into which a socket 48 is threaded. Socket 48 has a bore 49 extending radially of the spindle and open at the outer end, and it is formed with a peripheral groove 50 (FIG. 4) in its outer surface. Preferably a plurality of holes 51 having an inner end of a smaller diameter, extend between the groove 50 and the bore 49. A pin 52 has a portion thereof fitted within the bore 49 of the socket 48, and the pin 52 is formed with a peripheral groove 53. A resilient split ring 54 fits in the peripheral groove 50 of the socket 52. A ball 55 is inserted in each hole 51 and embraced by the split ring 54, so that a portion of the ball 55 projects from the smaller-diameter end. When the end of pin 52 is inserted into the socket bore 49, the balls 55 will snap into the groove 53 due to the resilience of the split ring 54, and the balls hold the pin 52 in the socket.

A rod 56 extends substantially vertically from the machine frame, or substantially axially of the spindle, and it is immovable angularly about the axis of the spindle. The pin 52 is engageable with the rod 56 to hold the sleeve 42 and the ring 39 against rotation.

MODIFICATION

Figure 5:
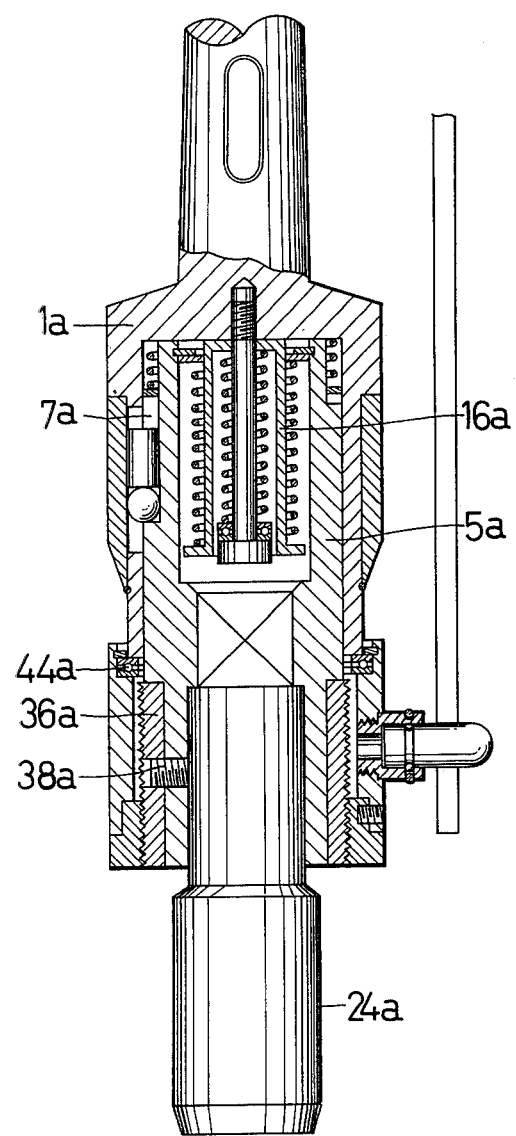
FIG. 5 is an elevation mainly in axial section of another form of this invention, at a position where the tool begins to bite into a workpiece.

FIG. 5 shows a modified form of the invention with the parts in the position where tapping is just beginning and a driven cylinder 5a is at its most contracted or inward position. The construction is substantially the same as the embodiment shown in FIGS. 1 to 4 except as follows: An outer threaded sleeve 36a fits around a lower portion of cylinder 5a that projects from a driving cylinder 1a, even when at the most contracted position: A chuck 24a, cylinder 5a and sleeve 36a are rotatably fixed together simply by a screw 38a. Other differences are that a spring holder 16a is shorter in order to shorten the spindle, and that no annular seat is provided on a bearing 44a. Similarly to the first embodiment, the second form of spindle can be used for tapping or boring with depth control, without using the pitch control as shown in FIG. 4.

Operation

The operation of the two embodiments is as follows. The parts shown in FIG. 5 which are not numbered are to be considered as having the numerals for the equivalent or corresponding parts shown in FIGS. 1–4.

After the chuck 24 or 24a and the outer threaded sleeve 36 or 36a are fixed in place, the inner threaded ring 39 secured to the sleeve 42 is threaded on the sleeve 36 or 36a and turned relative thereto to be brought to a normal position as shown in FIG. 1, wherein the annular seat 46 on the bearing 44 is axially spaced from the upper or outer end of cylinder 1.

The spindle is moved downwardly so that the tap (not shown) contacts the workpiece (also not shown). The spindle is further moved downwardly so that the chuck 24 or 24a and the cylinder 5 or 5a are moved upwardly into the cylinder 1 or 1a. When the parts have contracted upwardly to the predetermined position where the downward movement of the spindle should be stopped, the inner end of clutch sleeve 6 is pressed outwardly by the spring 11. At this contracted position, the outer end of cylinder 1 or 1a preferably is still spaced from the annular seat 46 or bearing 44a, respectively, and the inner end of the cylinder 5 or 5a is spaced from the inner end of cylinder 1 or 1a thereby to avoid axial shocks which would occur between the parts by reason of the downward force from the machine driving the tool holder.

Thereafter, the cylinder 1 or 1a is rotated in the direction of the arrow 57 (FIG. 3) to drive the cylinder 5 or 5a, chuck 24 or 24a and sleeve 36 or 36a through the roller 8 and ball 9 and through the projection 30 and recess 29, but the sleeve 42 and the ring 39 cannot rotate because the pin 52 engages the rod 56. As a result, if the outer end of the cylinder 1 or 1a is still spaced from the annular seat 46 or bearing 44a, the rotation of sleeve 36 or 36a first causes the ring 39 and sleeve 42 to move upwardly relative to the sleeve 36 or 36a, the chuck 24 or 24a and the cylinder 5 or 5a, until the outer end of the cylinder 1 or 1a engages the seat 46 or the bearing 44a as shown in FIG. 5. Continued rotation of the sleeve 36 or 36a then forces this sleeve to move downwardly according to the pitch of threads 37, 40, whereby the tool will tap the workpiece accurately with its pitch being the same as that of the threads 37 and 40, thereby preventing pitch errors which may otherwise occur due to the nature or conditions of the work.

As the tapping operation progresses (as shown in FIG. 2), the cylinder 5 or 5a telescopes outwardly against the force of springs 21 and 22. When the tapping progresses to a predetermined depth, and at the same time with the spring 11 urging the roller 8 and ball 9 to engage the outer end of slot 3 of cylinder 1 or 1 a, the ball 9 will disengage from the groove 7 of the cylinder 5 or 5a and knock or slide up over the angled inner side of the clutch sleeve 6 so that the cylinder 1 or 1a idles and stops the tapping operation. Reverse rotation of cylinder 1 or 1a will cause the ball 9 to engage the other acute or straight trailing edge of groove 7 so that the tap is reversely rotated and removed from the workpiece.

During the reverse rotation, the pitch control can prevent pitch errors which may occur by the force of springs 21 and 22 when urging the cylinder 5 or 5a upwardly, and which may affect the accuracy of the thread already cut by the spindle.

In the case of boring which does not require pitch control, the sleeves 36 or 36a, 39, 42 are removed from the spindle, or instead only the pin 52 is removed from the socket 48 to avoid engagement of the pin 52 with the rod 56, so that the cylinder 5 or 5a is resiliently held relative to the cylinder 1 or 1a during boring as in said U.S. Pat. No. 4,090,806. The spindle is rotated and moved downwardly until the tool bites materially into the work. Then the downward movement of the spindle is stopped and continued rotation thereof will allow the tool to bore to a predetermined depth until the ball 9 disengages from the groove 7. Early in boring operation, the force of spring 11 helps the tool bite, and, throughout the boring operation, axial shocks to or axial overloads on the tool can be resiliently absorbed and will not be directly transmitted to the cylinder 1 or 1a.

I claim:

1. A rotatable tool holder for driving a tool having a pitch against a workpiece, said tool holder being adapted to be mounted in a machine and rotated on a tool holder axis, comprising a driving cylinder, a driven cylinder reciprocatable and rotatable within said driving cylinder means resiliently connecting said driven cylinder on said driving cylinder, said driven cylinder being adapted to be attached with the tool, first thread means reciprocatable and rotatable together with said driven cylinder and having the same pitch as said tool, and a second thread means in threaded engagement with said first thread means and rotatable and reciprocatable relative to said driving cylinder, said second thread means having means engageable with a member angularly immovable about the axis of said tool holder for preventing rotation of said second thread means together with said first thread means and said driving and driven cylinders, such that rotation of said first thread means forces the tool to be advanced accurately with the same pitch of the tool, and further comprising means normally connecting said driving and driven cylinders for rotation together, said driving cylinder being disconnectable from said driven cylinder to stop said driven cylinder from rotating when said driven cylinder has moved to a predetermined position relative to said driving cylinder.

2. A tool holder as in claim 1, wherein said second thread means is in the form of a sleeve having a thrust bearing for rotatable engagement with said part of said driving cylinder, said means engageable with a member comprising pin means projecting radially outwardly from said second thread means for engagement with said member that is angularly immovable about the axis of said tool holder.

3. A tool holder as in claim 2, wherein said pin means is attachable to and detachable from said second thread means.

4. A tool holder as in claim 1, and further comprising chuck means for chucking a tool attachable to said driven cylinder and axially immovable relative thereto but rotatable together therewith.

5. A tool holder as in claim 1 or 4, wherein said first thread means comprises a sleeve adapted to be fixed around a portion of said chuck means which projects from said driving cylinder.

6. A tool holder as in claim 1 or 4, wherein said first thread means comprises a sleeve adapted to be fixed around a portion of said driven cylinder and projects from said driving cylinder.

* * * * *